ULTRA-HIGH FREQUENCY TUNER OF CONSTANT BAND-WIDTH

Filed Nov. 2, 1953 2 Sheets-Sheet 1

INVENTOR.
EDWIN M. HINSDALE, JR
BY H. L. Newton
ATTORNEY

ULTRA-HIGH FREQUENCY TUNER OF CONSTANT BAND-WIDTH

Filed Nov. 2, 1953 2 Sheets-Sheet 2

INVENTOR.
EDWIN M. HINSDALE, JR.

BY

ATTORNEY

United States Patent Office 2,798,945

Patented July 9, 1957

2,798,945

ULTRA-HIGH FREQUENCY TUNER OF CONSTANT BAND-WIDTH

Edwin M. Hinsdale, Jr., Baldwin, N. Y., assignor to Radio Corporation of America, a corporation of Delaware Application November 2, 1953, Serial No. 389,605

7 Claims. (Cl. 250—20)

This invention relates generally to variable ultra-high frequency tuners for signal translating systems, and particularly to variable capacitor type tuning systems which are adapted for relatively wide range high frequency tuning.

More particularly, the invention relates to a variable capacitor type tunable resonant structure adaptable for use as a signal selecting circuit in a radio receiving system which has a substantially constant frequency bandwidth characteristic over a predetermined tuning range.

Recently the allocation of the frequency spectrum between 470 and 890 megacycles for broadcasting of television signals has enabled the assignment of some seventy additional television ultra-high frequency channels in addition to the twelve presently existing V.-H.-F. television channels. Accordingly, existing television receiving systems which have been designed to receive the aforementioned twelve presently allocated television channels are incapable of receiving the radio frequency carrier waves transmitted on the ultra-high frequency channels. Circuit modification or an additional converter circuit designed to receive the ultra-high frequency carrier waves are, therefore, required to enable reception of the ultra-high frequency channels. Such modification preferably may include means for converting the ultra-high frequency carrier wave into a lower frequency carrier wave which can be accepted by a conventional very high frequency television receiver.

For any television broadcast receiver adapted to receive signals within the new ultra-high frequency television band, a tunable bandpass signal selecting input circuit is required, which may be provided between the antenna and the first radio frequency amplifier, or if no radio frequency amplifier is provided, between the antenna and the mixer stage.

The tunable antenna input circuit of this type must be capable of passing a band of frequencies at least as great as the intermediate frequency bandwidth of the receiver with which it is used, with enough extra to provide for oscillator tracking tolerance. In order to minimize the various spurious responses, the bandpass of the input should have a relatively sharp cut-off outside the passband. Since, as mentioned above, there is space for some seventy additional channels in the U.-H.-F. band, it is necessary that the bandpass input circuit of the ultra-high frequency tuner which is attached for use with a conventional very high frequency television receiver, be capable of selecting any one of a number of signals having frequencies in closely adjacent channels. It is desirable, therefore, that the bandpass circuit of the tuner have substantially a constant predetermined narrow bandpass response characteristic over its entire tuning range.

In accordance with the invention, the receiver input circuit or bandpass filter system comprises a pair of coupled resonant circuit structures each of which includes a butterfly type variable capacitor enclosed within a highly conductive shield or enclosure member. The butterfly type capacitor comprises two sets of oppositely disposed stator plates and complementary rotor plates. The stator plates are mounted on opposite inner walls of the shield or enclosure member so that the walls in a rectangular box form of enclosure, may provide the necessary inductive connection between the opposite sets of stator plates to form the resonant circuit.

The form and dimensions of the conductive enclosure for the variable capacitor are not critical and it is recognized that there are a number of different geometric forms which might be used. However, to avoid needless repetition and to avoid confusion the description of the tuning device hereinafter set forth is limited to the discussion of a shielding structure having a rectangular box form.

The pair of resonant circuit structures described above are positioned adjacent to and contiguous with each other and have an aperture in the common adjoining wall to provide communication between the interiors of the two structures. The tuning shafts of the butterfly capacitors are connected together by an insulating sleeve or the like, which extends through the aperture for simultaneous tuning of the capacitors. The aperture in the common adjoining wall thus serves the purpose of providing clearance for the tuning shaft connecting member and also provides a predetermined amount of capacitive coupling between the two tuning structures.

It is well known that the frequency bandpass characteristic of simple coupled resonant circuits or structures is a function of the loaded Q's and of the coupling factor. For a given tuned frequency of the resonant structure described above, therefore, the bandwidth passed is primarily dependent upon the loaded Q and the size of the aperture in the adjoining wall of the two sections. However, as the capacitors are tuned through their frequency range the instantaneous bandwidth passed is approximately inversely proportional to the resonant frequency to which the structures are tuned. In order to compensate for this change in bandwidth as the device is tuned through its frequency range, additional variable coupling means are provided between the two resonant sections.

In accordance with the invention, this coupling means comprises a pair of coupling loops which are electrically connected together and are mounted on the insulating tuning shaft connecting member so that one loop is positioned inside each of the shielding or box members. The loops are rotatable with the tuning shaft as the capacitors are tuned through the U.-H.-F. range, and are positioned to have a variable angular relationship with respect to the magnetic field inside each conductive box member as the shafts are rotated.

The loops are perpendicular to the magnetic field in each box when the resonant structure is tuned to the minimum frequency and they are parallel to the magnetic fields at maximum frequency. The coupling due to the loop, therefore, is minimum at maximum frequency and increases with decreasing frequency. A balance in the degree of a variable loop and aperture coupling respectively results in a substantially uniform bandwith response throughout the tuning range.

A resonant tuning structure using a butterfly capacitor and similar to that described above may also be used as the frequency determining element of an ultra-high frequency oscillator. The oscillator circuit may be positioned close to the input bandpass structure and the tuning elements of the oscillator and bandpass antenna input structure may be ganged for simultaneously tuning over the frequency band. The output of the oscillator is coupled from the oscillator box into one section of the input circuit for mixing with the received ultra-high frequency signal to produce a heterodyne or intermediate frequency signal which in the case of standard V. H. F. television receivers is on the order of 40 megacycles.

It is a principal object of this invention to provide an improved ultra-high frequency tuning structure for ultra-high frequency signal conveying circuits which is continuously tunable over a very wide portion of ultra-high frequency range and which is relatively small in size and simple and compact in form and easily reproducible with present mass production techniques.

It is a further object of this invention to provide an improved ultra-high frequency tuning structure for ultra-high frequency signal selection circuits which passes signals having substantially a constant bandwidth as the structure is tuned over a relatively wide ultra-high frequency range.

It is a still further object of this invention to provide a tunable ultra-high frequency filter structure tuned by parallel plate butterfly type variable capacitors and having a frequency passband characteristic which is relatively constant in width throughout the tuning range.

Another object of this invention is to provide an ultra-high frequency conversion system for converting ultra-high frequency carrier waves to lower frequency carrier waves and which advantageously includes a simplified tuning structure in which a pair of parallel plate butterfly type gang capacitors operatively contained in separate shielding or box sections are coupled together for providing a substantially constant frequency bandwidth across a wide band of ultra-high frequencies.

A further object of this invention is to provide a compact and simplified ultra-high frequency tuning structure which may effectively operate with parallel plate type ganged capacitors for continuous tuning through a wide range of ultra-high frequencies and having a minimum of radiation.

The novel features which are considered characteristic of this invention are set forth with particularity in the appended claims. The invention itself, however, both as to its organization and method of operation as well as additional objects and advantages thereof, are best understood from the following description when read in connection with the accompanying drawings, in which:

Figures 1, 2:
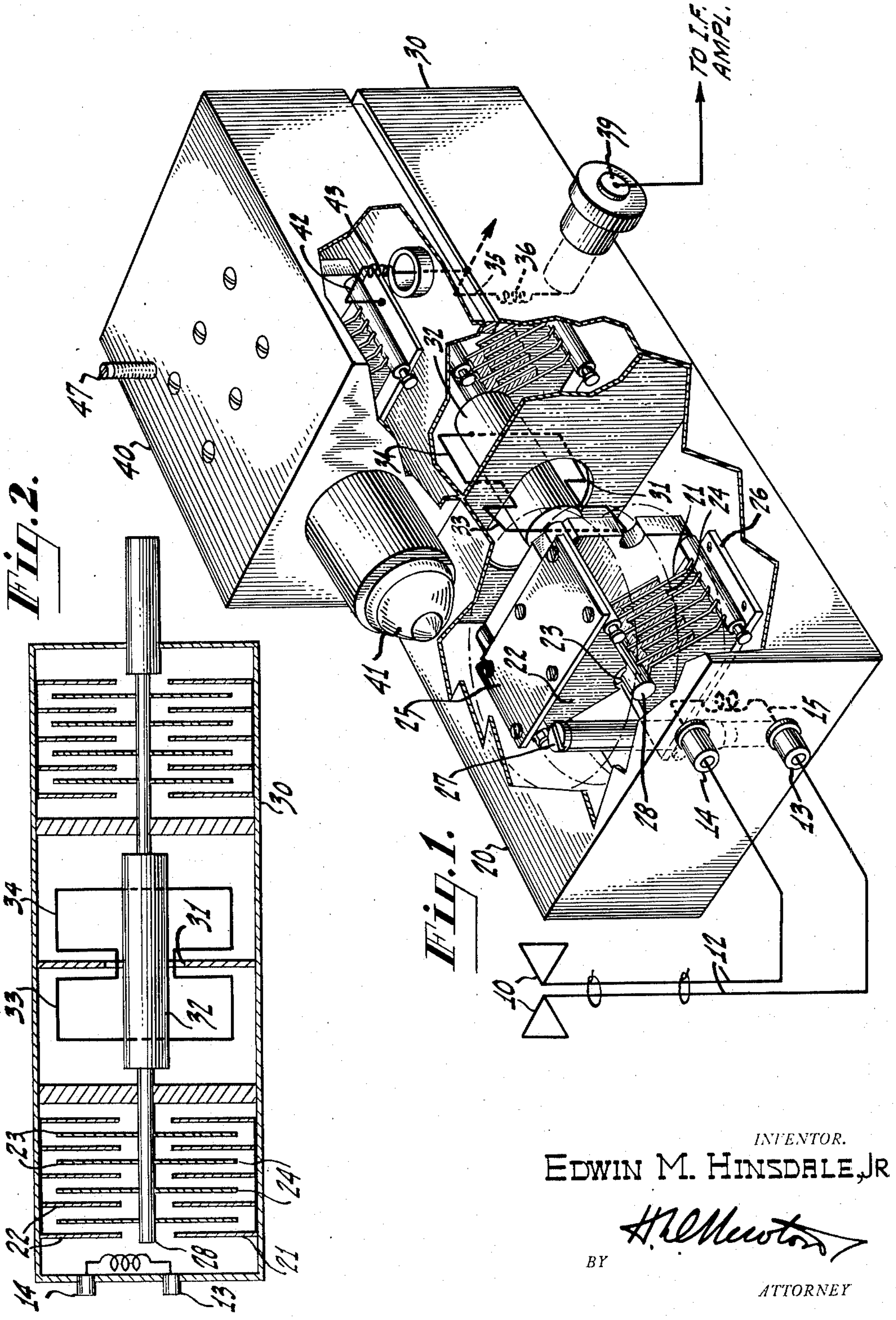
Figure 1 is a perspective view of an ultra-high frequency tuning system constructed in accordance with the invention, with portions broken away to show certain details thereof.
Figure 2 is a side view in cross-section, of a portion of the tuner structure of Figure 1 to illustrate the operation of the system in accordance with the invention.

Referring now to the drawings wherein like reference characters are used in the various figures to designate like components and equivalents thereof, and particularly to Figure 1, an antenna 10 representing any conventional signal pickup means, is provided for receiving ultra-high frequency signals. A conventional twin-conductor balanced transmission line 12 having good performance characteristics up to 900 megacycles and having an impedance to match that of the antenna is connected between the antenna 10 and a pair of antenna input terminals 13 and 14 to conduct the received signals from the antenna to the receiver input.

The terminals 13 and 14 are connected with an input coupling loop 15 which is located on the inside of a box or enclosure 20 which is formed of a highly conductive material, and couples the ultra-high frequency signals from the antenna to the tuning system. It was found that the coupling obtained by a section of #18 wire having three turns of leakage reactance provided in the center provided adequate loading of the input box 20.

The first resonant circuit structure comprises a relatively large lumped variable capacitance and a small inductance which is actually a highly conductive metal box housing 20 or may be any other conductive shell and a balanced split stator or butterfly capacitor having two sets of oppositely disposed stator plates 21 and 22 and two sets of conjugate rotor plates 23 and 24 mounted on a tuning shaft 28. It was found that the optimum inside dimensions for a metallic box housing were 2⅝" x 2⅝" x 1$\frac{7}{16}$", and the capacitance range of the butterfly capacitor used was from three micromicrofarads to 15 micromicrofarads.

At maximum capacitance the tuned circuit resonates at 450 megacycles and the effective inductance calculates to be .008 microhenry. With the capacitance set in the minimum position the structure resonates at 1200 megacycles and the inductance computes to be .006 microhenry. The apparent change in inductance is due to the inductance of the capacitance plates and is in the direction of increasing the tuning range of the structure.

The butterfly capacitor is mounted in approximately the center of the box or chamber 20 and the capacitor end plates 25 and 26 which support the oppositely disposed sets of stator plates are fastened to opposite walls of the box 20 in such a manner that good electrical contact is insured. Poor contact between the butterfly capacitor and the box 20 results in excessive resistance which greatly decreases the Q of the resonant structure.

By silver plating the box 20 and the capacitor end plates 25 and 26 and fastening the end plates of the capacitor to the walls of the box with screws, good contact is established and maintained. However, it is recognized that other methods of fastening such as soldering or welding would also produce acceptable electrical contact between the capacitance and the box.

A trimmer capacitor 27 is provided adjacent the butterfly capacitor and between the top and bottom of the box 20. The capacitor 27 provides a small capacitance adjustment to align the bandpass input circuit so that the frequency range over which the input circuit is tuned will differ from the local oscillator frequency by a predetermined amount over the frequency range.

In describing the principle of operation of the resonant structure an analogy to a lower frequency circuit is helpful. The inductance may be conceived as a loop of wire connected between the two sets of stator plates of the butterfly type capacitor. By rotation of the loop of wire about the capacitor a closed surface is generated. Electrically, the closed surface consists of a large number of parallel loops which together reduce the single loop inductance to a small value which is acceptable in the ultra-high frequency range.

There are a number of possibilities for the form and dimensions for the generated surface. Among these, several cylindrical and rectangular parallelepiped forms were successfully investigated. The dimensions of the structure are governed by requirements such as physical size of the capacitor and the required value of inductance. In each case the capacitor chosen was one that was commercially available and of the proper frequency to tune the ultra-high frequency range.

It was found that butterfly capacitors of the type shown in Figure 1 provide better results than the single stator type variable capacitor. A single stator capacitor in the tuned circuit requires circulating currents to flow through its rotor shaft and hence, needs wiping contacts. However, current need not flow through the rotor shaft of the butterfly capacitor operating in split stator fashion. Since the butterfly capacitors do not need wiping contacts and hence are not troubled by the resulting contact resistance, considerably higher Q structure is obtained.

A second tuning structure including a butterfly type variable capacitor and substantially similar to that described above is enclosed in the highly conductive metallic box 30. The boxes 20 and 30 are positioned to have an adjoining wall, which has an aperture 31 cut therein. The shaft 28 upon which the rotor blades 23 and 24 of the butterfly capacitor are mounted is connected to an insulating shaft portion 31 which extends through the aperture 31 and is to the shaft supporting the rotor blades of the butterfly capacitor contained in the metallic box 30.

Two conductive coupling loops 33 and 34 are positioned in the boxes 20 and 30 respectively. The loops are electrically connected together and are mounted on the insulating coupling member 32. As will be hereinafter explained, a variable amount of coupling is provided between the resonant structures as the tuning shaft of the butterfly capacitors is rotated.

Figure 3:
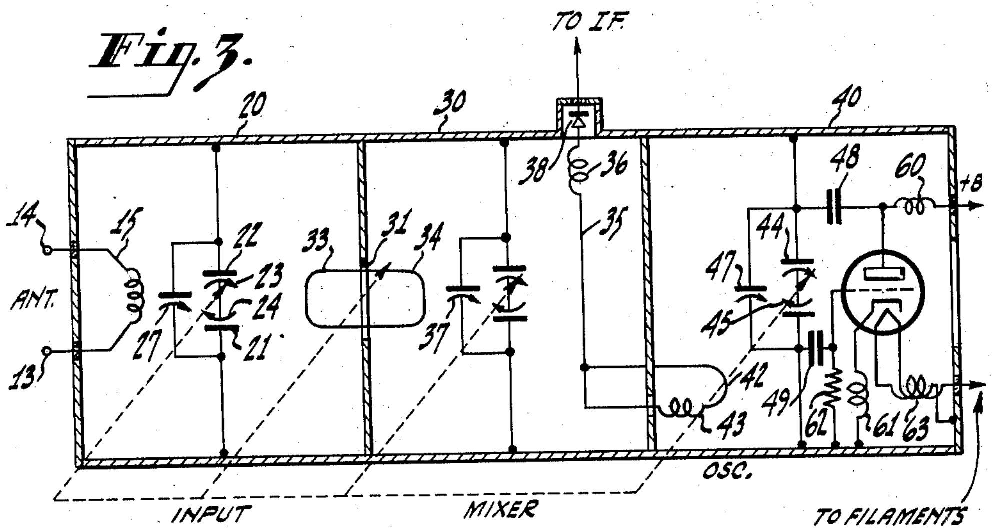
Figure 3 is an equivalent schematic diagram of the ultra-high frequency tuning system shown in Figure 1.

The particular type of oscillator circuit employed in the practice of the present invention is not important, the one shown in Figure 3 being merely illustrative of one type of oscillator circuit finding conventional application to the particular circuit shown. By way of example the oscillator tube 41 is connected in an ultra-audion or modified Colpitts circuit. The frequency determining element of the oscillator circuit is a tuning structure including a butterfly type variable capacitor enclosed in a conductive box 40 and is substantially similar to that described above in connection with the box 20.

The schematic circuit diagram of the oscillator is shown in Figure 3 to which reference is now made. The frequency varying elements of the oscillator are the two sections 44 and 45 of the variable butterfly type capacitor which are contained in the conductive box 40. These capacitor sections which together with the inherent inductance of the walls of the box 40 form a tuned circuit, are connected between the control electrode and anode electrode of the oscillator tube 41. Since the variable butterfly capacitor comprising elements 44 and 45 are ganged by a mechanical linkage (not shown) with the butterfly capacitors of box 20 and 30, the input circuit and the oscillator circuit will be tuned simultaneously by rotation of a single control. By proper adjustment of the circuit components the oscillator circuit tuning and the antenna input circuit tuning may be made to track over a relatively wide ultra-high frequency range.

A pair of direct current blocking capacitors 48 and 49 are respectively connected between the anode electrode and one of the two butterfly stator sections and the control electrode and the other of the two stator sections. A trimmer capacitor 47 which is effectively connected across the two stator plates of the butterfly capacitor provides an adjustment for determining the limits of the useful frequency range of the oscillator circuit.

The anode of the oscillator tube 41 is connected to a source of polarizing potential +B through a radio frequency choke coil 60 which coil provides a high impedance to keep the power supply from loading the oscillator resonant circuit and keeps high frequency signal energy out of the power supply, thus preventing other circuit disturbance. By providing a second radio frequency choke coil 61 between the cathode and ground or a point of reference potential more dependable operation of the oscillator may be obtained. A grid leak resistor 62 is connected between the grid of the oscillator tube 51 and ground to provide a direct current return path between the grid and the cathode. The filaments of the oscillator tube 41 are connected through a bifilar coil 62 to a source of filament supply current.

In a modified Colpitts circuit as described above, the interelectrode tube capacitances serve to provide the necessary feedback to maintain oscillation. In addition, the interelectrode capacitances act partially as the frequency determining elements of the oscillator circuit. Variations of these tube capacitances caused by changes in temperature, voltage and the like effect the frequency stability of the oscillator. The degree to which the frequency stability is effected will depend upon oscillator design and circuit parameter values.

In construction of the oscillator good results are obtained by mounting the tube socket on the last stator plates of the two sections of the butterfly type capacitor. This construction permits a reduction of lead length and brings the tube closer to the center of the box 40 and thereby nearest the highest impedance point in the tuned circuit.

The effective tuning capacitance in the oscillator circuit consists of the butterfly capacitor shunted by the series combination of the direct current blocking capacitors 48 and 49 and the interelectrode capacitances of the oscillator tube 41. Because the tube capacitances are tapped down on the tuned circuit, and their values are small compared to the main tuning capacitor, small variations in interelectrode capacitance have only a small effect upon tuned frequency.

Measurements taken on an oscillator circuit using a 6AF4 electron tube and a resonant structure as described show that at 930 megacycles the effective tube capacitance was approximately half the total circuit capacitance. This means that there is an improvement of frequency stability by a factor of about two in the case where the tube is the only contributor of the capacitance. As the tuning capacitance is increased, the stability is further improved until at the low end of the frequency band the effective tube capacitance is approximately one fifth of the total circuit capacitance.

Figure 4:
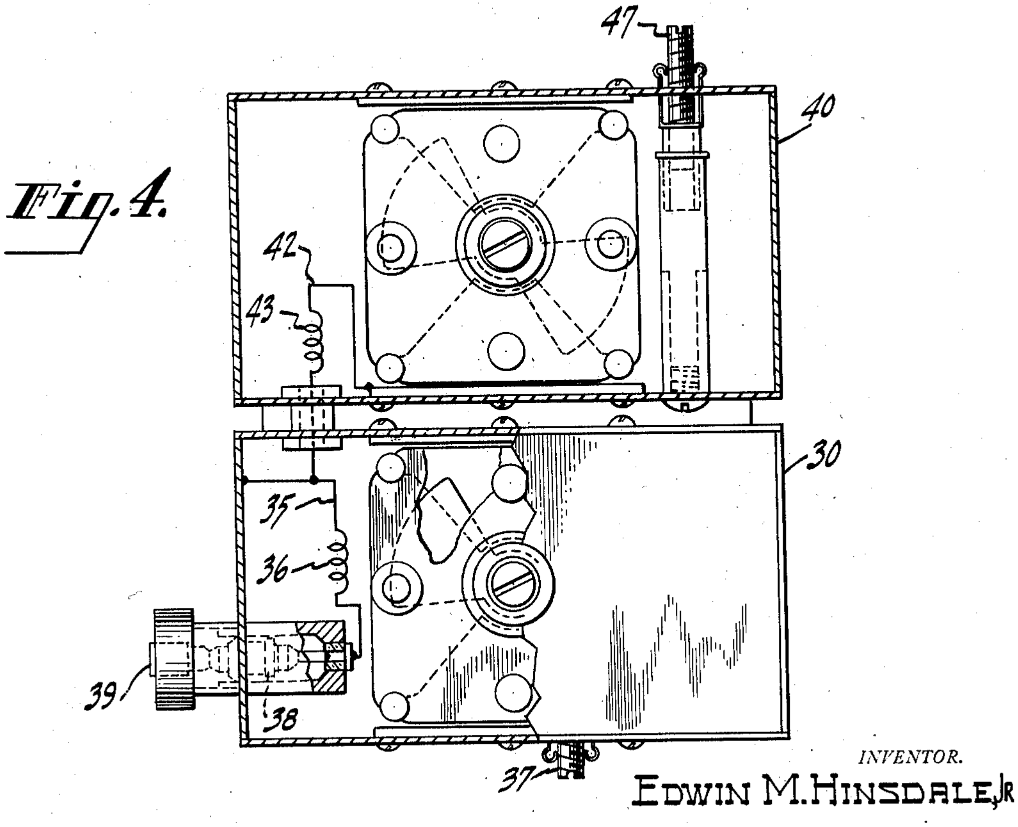
Figure 4 is an end view of the ultra-high frequency tuning system shown in Figure 1 with portions broken away to show details of the internal circuit connections.

A coupling loop 42 best shown in Figure 4, is placed inside the oscillator box 40 to pick up a predetermined amount of the oscillator energy. One end of the loop 42 passes through an aperture in the wall adjoining the oscillator box 40 and the box 30.

An output coupling loop 35 which picks up the signal energy is located in the box 30 and is connected with the mixer diode 38 which may be, for instance, a 1N82 ultra-high frequency silicon diode. The end of the tube coupling loop 42 which extends into the box 30 is tapped onto the output coupling loop 35 at a low impedance point for coupling a predetermined amount of oscillator energy to the mixer diode 38.

It was found that crystal conversion loss, noise temperature and internal impedances are a function of the crystal current. It was also found that the tuner noise figure which is a general measure of the system merit, changes less than 1 db as the crystal current is varied over a range of .5 to 3 ma. Below .5 ma. the conversion efficiency decreases rapidly and above 3 ma. the crystal noise temperature becomes excessive. Thus it is desirable to keep the crystal current between .5 ma. and 3 ma. Experiments have shown that when mixer diodes of the above type are adjusted to have a given rectified current, the crystal excitation at a high oscillator frequency seems to be considerably less than for lower oscillator frequencies. Thus, the oscillator injection circuit must be modified to insure uniform mixer operation. Accordingly, leakage reactance turns 43 are provided in series with the oscillator coupling loop 42 to reduce the crystal current change as the tuned frequency is increased.

Coupling of the received ultra-high frequency signals to the crystal is a function of the loop area of the coupling loop 35 and the distance of the loop from the center of the box. A few turns of leakage reactance 36 are included in the loop to reduce the loading on the crystal as the tuned frequency is increased. This is necessary because the operating Q of the tuned circuit varies inversely with the frequency when coupled to a constant load. However, unless the loading is made variable the bandwidth response of the input circuit will change considerably as the circuit is tuned from the low to the high end of the frequency range.

Since the Q's of the tuned circuits change with tuned frequency, the coupling between the two circuits must decrease as the Q's decrease, to maintain a relatively constant bandwidth or the same radio frequency response shape. As best shown in Figure 2, the inter-box coupling between the input box 20 and the mixer box 30 consists of a fixed aperture 31 and a pair of loop members 33 and 34. The loops are electrically connected together and are mounted for rotation on the insulating shaft 32 which is rotated to tune the resonant structures through the ultra-high frequency range.

It can be seen that an electromagnetic field surrounds the capacitors within the respective boxes as shown by the dotted lines *x.x.* Its distribution is dependent upon the magnitude and density of the circulating currents on the inside surfaces. If the inside surface were to consist of a great number of parallel current paths all of which are connected to the center of the box then the currents would flow outward from the capacitor, along these paths, down the sides of the box and back again to the capacitor. The paths carrying the most currents would be the shortest or those of least impedance, and within a symmetrical box would cross each of the four rectangular sides at their centers.

Consider next the current density, and assume, for the moment, that current flows equally in all directions from the center of the box. The density on the inside surface is then inversely proportional to the distance from the capacitor. This means that current density is greater at the center of each side of the box than at the corners. However, as noted in the previous paragraph current does not flow equally in all directions, but favors the shortest paths. The combined effect is to increase further the current density at the center of each side and decrease the density in the corners.

A magnetic field is produced with a strength that is proportional to the current density, and in a direction that is at right angles to the current flow. This implies that the magnetic field within the box is strong at the midpoint of the sides, and weak in the corners.

The coupling loops 33 and 34 which are mounted on the insulating shaft 32 which couples the rotor elements of the two-butterfly capacitors contained in the boxes 20 and 30 are arranged at right angles to the magnetic field when the rotor elements are fully meshed with the stator elements of the butterfly capacitors. Thus, at the low frequency end of the band maximum coupling is provided between the resonant structures.

When the tuning shaft is rotated through 90° the coupling loops 31 and 32 are rotated into parallel relation with the magnetic field in each box and the coupling decreases. Thus the coupling between the resonant structures is minimum at minimum capacitance or at the high frequency end of the band. Proper combination of the variable loop coupling the aperture coupling results in a uniform bandwidth response for the tuning structure throughout the frequency band to be tuned.

The aperture size is adjusted to provide the required inter-box coupling at the high end of the band and the loop size is adjusted for the necessary additional coupling at the low end.

The improved, compact highly efficient ultra-high frequency tunable resonant structure described, which comprises butterfly type capacitors contained within the conductive box has provided a simple and practical solution to the problem of wide range tuning in the ultra-high frequency commercial signal receiving apparatus enabling the tuning device for quantity production such as television receivers. The tunable resonant structure described has been provided with means for maintaining a constant frequency bandwidth for proper selection of the desired signal frequency without disturbances resulting from spurious and undesired signals.

What is claimed is:

1. A tunable ultra-high frequency filter structure comprising a pair of enclosure members each of which provides conductive wall elements defining a predetermined space, said members having a common conductive wall portion, means providing a communicating opening in said common wall portion between the interior spaces of the enclosure members, a tunable resonant circuit including parallel plate type variable capacitor located inside each of said conductive members and electrically connected for operation therewith, magnetic coupling means including an inductive loop extending through said opening for providing a magnetic coupling between the members, and means for moving said inductive loop as the resonant frequency of said tunable resonant circuits is changed.

2. A tunable high frequency structure comprising structural elements providing a pair of tuned resonant circuits and including a pair of conductive housings positioned in adjoining relation to each other and having a communicating opening connecting the interiors of said housings, a parallel plate butterfly type variable capacitor having sets of oppositely disposed stator plates and conjugate rotor plates located within each of said conductive housings, said stator plates electrically connected with said housings, magnetic coupling means including a conductive loop extending in said opening providing a predetermined inductive coupling between the housings, and means for moving said rotor plates relative to said stator plates to tune the high frequency structure, and further means for moving the magnetic coupling loop as the resonance frequency of the structure is varied.

3. An ultra-high frequency tuning structure comprising structural elements providing a pair of tuned resonant circuits and including a pair of conductive housings positioned adjacent each other and having a communicating opening between the interiors of said housings to provide capacitive coupling therebetween, a parallel plate butterfly type variable capacitor having sets of oppositely disposed stator plates and conjugate rotor plates located inside each of said conductive housings, said stator plates electrically connected with said housings and said rotor plates mounted on a rotatable shaft, an insulating mechanical connecting member extending through said opening to connect the shafts supporting the rotor plates, and magnetic coupling means comprising a conductive loop mounted on said insulating mechanical connecting means and extending through said opening for providing a predetermined amount of magnetic coupling between said sections, and said loop being mounted at substantially right angles to the magnetic flux in each of said housings when said capacitors are adjusted to provide maximum capacitance whereby said structure has a substantially constant frequency passband.

4. In a superheterodyne radio receiver adapted to receive selected signals in the ultra-high frequency range, the combination with means for intercepting ultra-high frequency signals, of a tunable resonant structure comprising a pair of conductive shells having a common surface portion with an aperture therein, a parallel plate butterfly type variable capacitor having two sets of stator plates and conjugate rotor plates positioned within each of said shells, said stator plates being electrically connected at different points on said shell and said rotor plates mounted on rotatable shafts, said rotatable shafts being connected for simultaneous rotation by an insulating member extending through said aperture, magnetic coupling means comprising a conductive loop mounted on said insulating shaft and extending in each of said shells, said loops mounted at right angles to the magnetic field in each of said shells when said capacitors are adjusted for maximum capacitance, means coupling said intercepted ultra-high frequency signals with one of said shells, signal mixing means coupled with the other of said shells, oscillator means for generating a source of signals of a predetermined frequency connected with said mixing means, and utilization means connected with said signal mixing means.

5. An ultra-high frequency converter adapted to select certain signals in the ultra-high frequency range and provide lower frequency signals in response thereto, comprising a tunable resonant structure including an elongated conductive enclosure, said elongated enclosure divided into a pair of chambers by a transverse conductive partition having a communicating opening therein, a parallel plate butterfly type variable capacitor having two sets of stator plates and conjugate rotor plates positioned within each of said chambers, said stator plates being electrically connected at predetermined points on said enclosure and said rotor plates mounted on rotatable shafts, said rotatable shafts connected for simultaneous movement by an insulating member which extends through said opening, inductive coupling means comprising a conductive loop mounted on said insulating shaft and extending into each of said chambers, said loop mounted at right angles to the magnetic field in each of said chambers when said capacitors provide maximum capacitance, signal mixing means coupled with one of said chambers, tunable ultra-high frequency oscillator means coupled with said mixing means, and utilization means connected with said mixer.

6. An ultra-high frequency converter adapted to select certain signals in the ultra-high frequency range and provide lower frequency signals in response thereto comprising a tunable resonant structure comprising a pair of conductive enclosures positioned in adjoining relation and having a communicating opening in the adjoining portion, a parallel plate butterfly type variable capacitor having sets of oppositely disposed stator plates and conjugate rotor plates positioned within each of said enclosures, said stator plates being electrically connected at predetermined points on said enclosures and said rotor plates mounted on rotatable shafts, said rotatable shafts being connected by an insulating member which extends through said opening, coupling means comprising a conductive loop mounted on said insulating shaft and extending in each of said enclosures, said loop mounted at right angles to the magnetic field in each of said enclosures when said capacitors provide maximum capacitance, signal mixing means coupled with one of said enclosures, tunable ultra-high oscillator means coupled with said mixing means, the frequency determining element of said tunable ultra-high frequency oscillator means comprising a tunable resonant structure including a parallel plate butterfly type variable capacitor enclosed by and electrically connected with a conductive housing, and utilization means connected with said mixer.

7. An ultra-high frequency tuning structure comprising an elongated conductive enclosure member, means for dividing said enclosure into separate chambers, said means comprising a conductive partition having an aperture therein for providing a predetermined capacitive coupling between said chambers, a tunable resonant circuit located in each chamber and electrically connected for operation therewith, magnetic coupling means including an inductive loop extending through said aperture to provide inductive coupling between said resonant circuits, means for varying the tuning of said resonant circuits and means associated with said last named means for simultaneously moving said inductive loop to vary the magnetic coupling between said chamber.

References Cited in the file of this patent

UNITED STATES PATENTS

| | | |
|---|---|---|
| 2,203,329 | Goldmann | June 4, 1940 |
| 2,247,212 | Trevor | June 24, 1941 |
| 2,272,062 | George | Feb. 3, 1942 |
| 2,341,345 | Van Billiard | Feb. 8, 1944 |
| 2,367,681 | Karplus et al. | Jan. 23, 1945 |
| 2,413,836 | Larson | Jan. 7, 1947 |
| 2,572,880 | Riebman | Oct. 30, 1951 |